United States Patent [19]
Kawawa et al.

[11] 3,793,006
[45] Feb. 19, 1974

[54] METHOD OF MANUFACTURING GRANULAR BASIC SLAG FORMING AGENT FOR USE IN STEEL MANUFACTURING

[75] Inventors: Takaho Kawawa, Kawasaki shi; Koichi Fukuro; Shunsuke Matsumura, both of Kuzuu machi, all of Japan

[73] Assignee: Nippon Kokan Kabushiki Yoshizawa Lime Industry Company Limited, Tokyo, Japan

[22] Filed: Sept. 15, 1971

[21] Appl. No.: 180,866

[30] Foreign Application Priority Data
Sept. 25, 1970 Japan.............................. 45-83702

[52] U.S. Cl............................. 75/94, 75/3, 75/55
[51] Int. Cl. ........ C22b 9/10, C21b 1/08, C21c 7/00
[58] Field of Search............................. 75/1, 3–5, 24, 75/25, 30, 94, 55

[56] References Cited
UNITED STATES PATENTS

| | | | |
|---|---|---|---|
| 3,645,719 | 2/1972 | Minnick | 75/94 |
| 3,669,618 | 6/1972 | Cappel | 75/94 |
| 3,519,386 | 7/1970 | Fedock | 75/94 |
| 3,169,852 | 2/1965 | Price | 75/94 |
| 3,649,248 | 3/1972 | Ishimitsu | 75/94 |
| 3,726,665 | 4/1973 | Minnick | 75/55 |
| 3,721,548 | 3/1973 | Hodge | 75/3 |

FOREIGN PATENTS OR APPLICATIONS

| | | | |
|---|---|---|---|
| 698,147 | 11/1964 | Canada | 75/25 |

*Primary Examiner*—Charles N. Lovell
*Assistant Examiner*—Peter D. Rosenberg
*Attorney, Agent, or Firm*—Flynn & Frishauf

[57] ABSTRACT

A granular basic slag forming agent for use in steel manufacturing is manufactured by the method comprising the steps of admixing 50 to 90 percent, by weight, of limestone, 10 to 50 percent, by weight, of ferric oxide, and 1 to 10 percent, by weight, of a member selected from the group consisting of carbonates and fluorides of alkali metals and alkaline earth metals and complex compounds thereof, pulverizing the resulting mixture, pelletizing the resulting powder to produce pellets of a predetermined grain size, and calcining the pellets in a rotary kiln to form calcined pellets each consisting of a core of burned lime covered by a coating of $2CaO \cdot Fe_2O_3$.

10 Claims, 4 Drawing Figures

METHOD OF MANUFACTURING GRANULAR BASIC SLAG FORMING AGENT FOR USE IN STEEL MANUFACTURING

BACKGROUND OF THE INVENTION

This invention relates to a method of manufacturing a highly reactive granular basic slag forming agent essentially consisting of lime and utilized for metallurgical purposes, particularly for steel making purposes.

Heretofore, the basic slag forming agent for use in steel making was exclusively burned lime which is ordinarily prepared by calcining limestones. Although the burned lime is classified into light-burned lime and hard-burned lime, the former is generally used today. However, preparation and use of such burned lime involve a number of problems. Thus, for example, when limestones are calcined to prepare burned lime having a particle size ranging from 5 to 30 mm for use in steel refining furnaces, it was unavoidable that about 10 percent of finer powders were formed. When charging them in steel refining furnaces, such fine powders scatter as dusts and hence are lost. This deteriorates the yield of burned lime. Further, as the burned lime is hygroscopic, it is not suitable to store the same over a long period of time. The moisture absorbed by the burned lime evaporates by absorbing heat when the lime is charged in the furnace, thus causing heat losses. Granular burned lime having a particle size ranging from 5 to 30 mm has a high melting point of about 2,600°C, so that melting becomes difficult. It melts only when it reacts with $SiO_2$ formed by the oxidized silicon contained in the molten steel occurring at the early stage of the steel refining operation and iron oxide so as to form the slag. At this time, however, layers of $2CaO \cdot SiO_2$ having a high melting temperature (2,130°C) are formed around granules of the burned lime thus delaying melting of granules. For this reason, it takes a long time to form the slag required for quick steel refining operation by converters which is usually completed in about 30 minutes, and the total quantity of the lime melts completely only when the refining operation is completed, thereby delaying dephosphorizing and desulphurizing reactions.

OBJECTS OF THE INVENTION

It is an object of this invention to provide a novel method of preparing granular basic slag forming agent which can eliminate the disadvantages described above.

According to the basic feature of this invention a fine powder of limestone is admixed with a fine powder of iron oxide such as converter ash, and a small quantity of a sintering promoting agent. The mixture is then calcined to coat fine particles of burned lime with layers of $2CaO \cdot Fe_2O_3$ (calcium ferrite) to obtain dense pellets of burned lime.

According to this invention, there is provided a method of manufacturing a granular based slag forming agent comprising the steps of admixing 50 to 90 percent, by weight, of limestone, 10 to 50 percent, by weight, of ferric oxide, and 1 to 10 percent, by weight, of a member selected from the group consisting of carbonates and fluorides of alkali metals and alkaline earth metals and complex compounds thereof, pulverizing the resulting mixture, pelletizing the resulting powder into pellets of a predetermined grain size, and calcining the pellets in a rotary kiln to form calcined pellets each consisting a core of burned lime covered by a coating of $2CaO \cdot Fe_2O_3$.

Preferably the pelletizing is performed by two steps. Thus, a portion of the powder is firstly pelletized into particles of smaller grain size than the predetermined grain size and the particles are then shaped into granules of the predetermined grain size together with the remaining portion of the powder. Further, it is necessary to provide a down draft continuous-grate type preheater for the rotary kiln to preheat the pellets on the moving grate at increasing temperatures so as to impart sufficient mechanical strength to the pellets and to keep its shape at a high temperature. The burned granules are cooled by air which is used as the combustion air for the rotary furnace.

Since resulting burned lime takes the form of granules or lumps, such limes do not scatter as dust at the time of loading. Moreover, $2CaO \cdot Fe_2O_3$ melts at a temperature of above 1,430°C at the early stage of the refining operation to disperse fine particles of burned lime to form the slag which is necessary for the dephosphorizing and desulphurizing reactions.

A high temperature of more than 1,400°C is generally required to combine limestone and iron oxide but such a high temperature is not desirable economically. Further, when calcined under such high temperature, growth of CaO crystals becomes excessive and results in hard burned lime having a poor slag forming character. For this reason, it is necessary to calcine the limestone at a low temperature.

As above mentioned, the invention provides a method of preparing a slag forming agent of the CaO — $2CaO \cdot Fe_2O_3$ system by calcining at a low temperature a mixture consisting of a fine powder of limestone, a fine powder of iron oxide such as converter flue dust and a small quantity of a sintering promoter. Among efficient sintering promotors may be mentioned carbonates and fluorides of alkali metals and alkaline earth metals such as fluorspar, Cryolite, soda ash, and sodium fluoride, and complex compounds thereof.

DESCRIPTION OF THE PREFERRED EMBODIMENT

Figure 1:
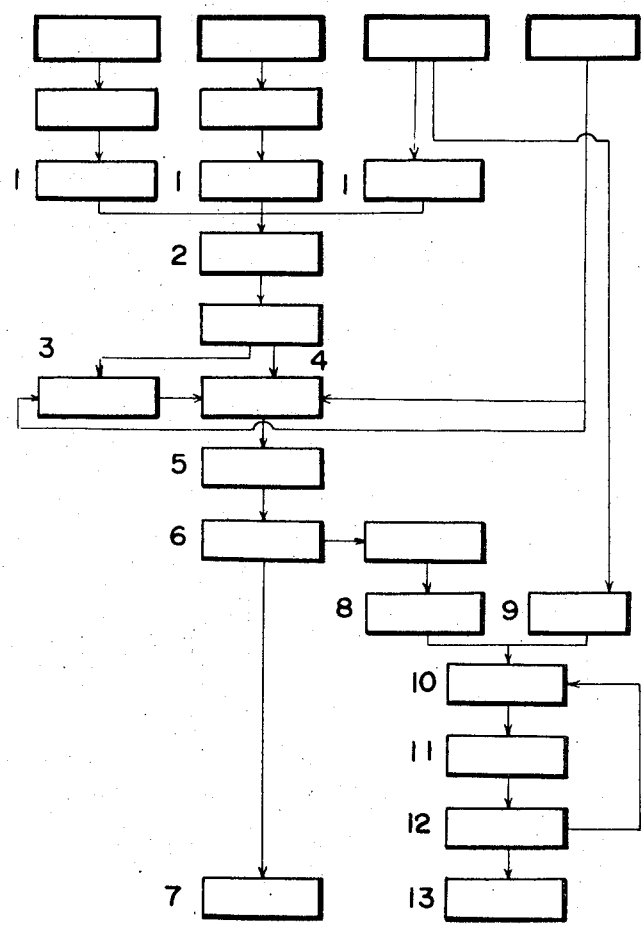
FIG. 1 is a flow chart to explain the process steps of the method of this invention.

The process steps of the invention will now be described with reference to the flow chart shown in FIG. 1. Components of the slag forming agent, that is limestone, ferric oxide such as converter flue dust and sodium carbonate acting as the additive are weighed by respective continuous weighing apparatus 1 and are then fed into a pulverizer 2 at a weight ratio of 85:14:1. The pulverized materials are formed into pellets by pelletizers 3 and 4 with addition of a suitable quantity of water. First, about 85 percent of the pulverized materials is charged into pelletizer 3 to form small pellets which act as the nuclei or core in the next step while 10 to 15 percent of charged material of water is being added. The small pellets are then transferred into the second pelletizer 4 to which remaining 15 percent of the pulverized materials and 3 to 10 percent of the new charge of water are added to form granules having a desired grain size of from 5 to 30 mm. Thus, it is one of the features of the invention to form strong pellets by at least two pelletizing steps. The resulting pellets are calcined in a rotary kiln 5 with a preheater of down draft continuous-grate type. Another types of preheaters are not suitable for the purpose of this invention because they can not preheat the pellets without imparting shocks thereto. Pellets having the thickness of less than 500 mm loaded on the moving grate of the preheater are heated by the exhaust gas of the rotary kiln whereby partially to form CaO as well as $2CaO \cdot Fe_2O_3$. The drying step comprises of drying for more than 1 hour in a gas atmosphere of about 800°C, of heating for more than 0.5 hr in a gas atmosphere of about 800°C in order to promote the formation of CaO. Thereafter, the pellets are maintained for a period of more than ½ hour in a gaseous atmosphere at a temperature of 1,200°C to raise their temperature to about 1,000°C to convert a portion thereof into $2CaO \cdot Fe_2O_3$. Then the pellets are admitted into the rotary kiln. In this manner, the granules have been imparted with sufficiently large mechanical strength and thermal stability before they are introduced into the rotary kiln. Such preheating also constitutes one of the invention. While passing through the rotary kiln, the pellets are calcined as they gradually transfer by the rotation and inclination of the kiln. It is important to maintain the surface temperature of the pellets in a range of 1,200° to 1,350°C for a period of more than 1.5 hours for the purpose of forming the coating of $2CaO \cdot Fe_2O_3$. The use of the rotary furnace enables mass production at low cost.

The calcined pellets are then discharged out of the rotary kiln and cooled by means of a suitable method. When air is used for the cooling, the heated air can be supplied to the rotary furnace as the combustion air. The calcined and colled pellets are passed through a sieve 6 to remove fine powders. The product of the desired grain size is stored in a storage tank 7 while the separated fine powders are weighed by a weighing machine 8 and are then supplied to a mixer 10 together with a weighed quantity of the additive. The mixer is then formed into briquettes by briquetting machine 11. Fine powders are removed from the briquettes by means of a sieve 12 and the secondary product thus obtained is stored in another storage tank 13. The fine powders removed by sieve 12 are returned to mixer 10 for reuse.

Thus, the invention provides a novel method of manufacturing at a low temperature of from 1,200° to 1,350°C a large quantity of dense slag forming agent consisting of fine nuclei of CaO coated and layers of $2CaO \cdot Fe_2O_3$. From the standpoint of economy it is advantageous to select a grain size of the raw material to be in a range of 300 to 450 mesh, preferably, although the size usable may be of less than 0.5 mm. On the other hand, for the sake of transportation convenience and the operation of the converters, a grain size of the product ranging from 5 to 30 mm is desired. Although the ratio of admixing the raw material components varies dependent upon the application of the product, a ratio of 50 to 90 percent of lime stone, 10 to 50 percent of ferric oxide and 1 to 10 percent (all by weight) of the additive is recomendable for steel refining furnaces, the percentage of the additive varying with the type thereof.

The product of this invention has following advantages:
1. Does not absorb moisture in the atmosphere so that it can be stored over a long period of time.
   Example: Comparison of the quantity of water absorbed
      Burned lime prepared by the prior method — absorbed 25 percent of water when exposed in the atmosphere for 8 days.
      The slag forming agent prepared by the novel method — absorbed only 0.2 percent of water under the same condition.
   The quantity of the water absorbed was determined by taking the weight of the sample before moisture absorption as 100 percent.
2. It is possible to manufacture burned lime at higher yields than by prior methods.
   Example: Denoting the quantity of CaO in the limestone by 100 percent, the yields of the products in terms of CaO are as follows.
      The yield of granular burned lime having a grain size of 5 to 30 mm and prepared by the prior method — 90 percent.
      The yield of the pelletized slag forming agent having a grain size of 5 to 30 mm and prepared by the method of this invention — 96 percent.
3. The prior art burned lime and the novel slag forming agent can be prepared with substantially the same quantity of heat energy, because they are prepared by calcining limestone at a temperature of 1,200° to 1,300°C. Although, the inventions requires to use ferric oxide, it does not increase the cost of manufacturing of steel because the iron contained in the ferric oxide is recovered in the steel refining furnace.
4. The pellet of the novel slag forming agent has a unique construction wherein a fine particle or core of CaO of a diameter of from 0.05 to 0.5 mm is covered by a coating of calcium ferrite $2CaO \cdot Fe_2O_3$ which melts at a temperature of 1,430°C. for this reason, when charged into a converter, for example, this coating of calcium ferrite melts at the early stage of the steel refining operation to cause fine particles of burned lime to disperse in another slag components thus increasing the speed of forming slag.

Figure 2:
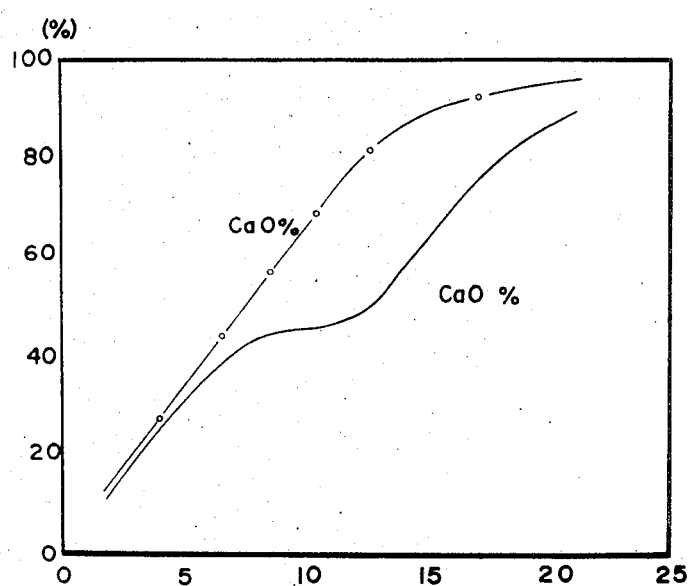
FIG. 2 is a diagram to show the speed of converting lime into slag.

FIG. 2 shows a comparison of the lime dissolving speeds where a prior art light burned lime and the novel slag forming agent are used in a 100 ton converter under conditions described below.

|  | Quantity of burned lime in terms of CaO component |
| --- | --- |
| Prior art lime | 55 kg per 1 ton of steel |
| Novel slag forming agent | 55 kg per 1 ton of steel |

Another conditions are the same. In FIG. 2, the melting speed of lime is represented in terms of the percentage of the lime component which has melted to form a homogeneous slag based on the total quantity of the lime component incorporated before commencing the refining operation or within 5 minutes after commencing the refining operation. With the prior art burned lime, at about 8 to 13 minutes after the commencement of the refining operation the melting speed of the lime slows down due to the formation of $2CaO \cdot SiO_2$ which covers the granules of the fired lime. With the prior art burned lime, 90 percent of such burned lime melts after 21 minutes after the start of the refining operation.

At this time the refining operation is almost over. In the case of the present invention, melting begins after 14 minutes leaving sufficient time for effective utilization.

Figure 3:
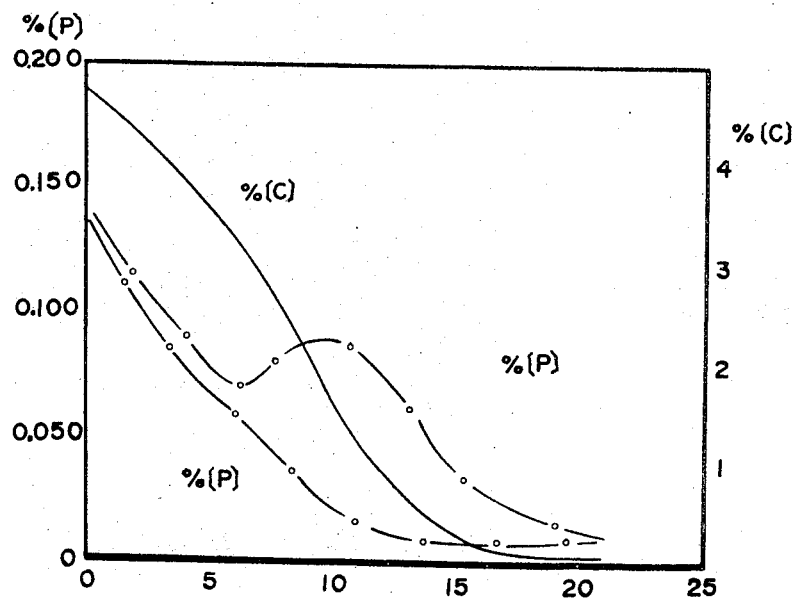
FIG. 3 is a diagram showing the dephosphorization speed.

FIG. 3 shows the dephosphorization speed with the same burned lime and slag forming agent as in FIG. 2. The quantity of phosphor in the steel when it is refined to contain 1 percent of carbon amounts to 0.075 percent with the prior art fired lime whereas to 0.012 percent with the novel slag forming agent.

Figure 4:
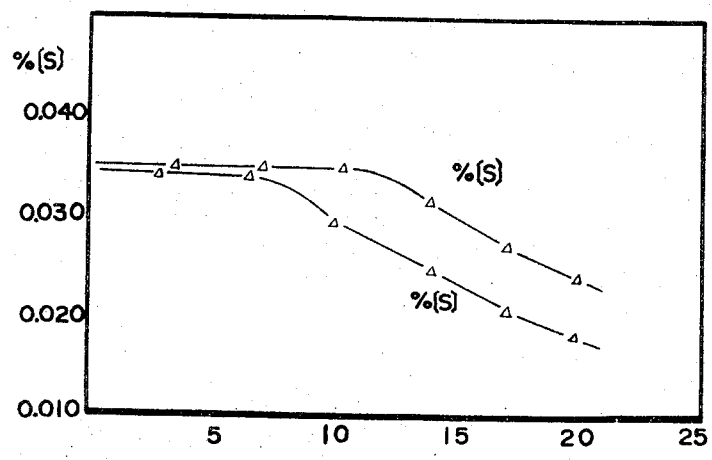
FIG. 4 is a diagram showing the desulphurization speed.

FIG. 4 shows the desulphurization speed. From this it can be readily understood that the novel slag forming agent improves the desulphurization speed also.

What is claimed is:

1. A method of manufacturing a granular basic slag forming agent for use in steel making comprising the steps of forming a mixture consisting essentially of 50 to 90 percent, by weight, of limestone, 10 to 50 percent, by weight, of ferric oxide, and 1 to 10 percent, by weight, of a member selected from the group consisting of carbonates and fluorides of alkali metals and alkaline earth metals and complex compounds thereof, pulverizing the resulting mixture, pelletizing the resulting powder to produce pellets of a predetermined grain size, and calcining the pellets in rotary kiln to form calcined pellets, each consisting of a core of burned lime covered by a coating of $2CaO \cdot Fe_2O_3$.

2. The method according to claim 1 wherein a portion of said powder is firstly pelletized into particles of smaller grain size than said predetermined grain size, then the remaining portion of said powder is added to said particles and the resulting mixture is pelletized into pellets of said predetermined grain size.

3. The method according to claim 1 wherein said rotary kiln is provided with a down draft continuous-grate type preheater, and said pellets are admitted into said rotary kiln after being preheated to a predetermined temperature for a predetermined period of time on said moving grate of said preheater.

4. The method according to claim 3 wherein said preheating of said pellets is performed in a gaseous atmosphere of increasing temperatures to partially convert the composition of said pellets into CaO and $2CaO \cdot Fe_2O_3$.

5. The method according to claim 1 wherein the pellets calcined in said rotary kiln and discharged out of said furnace are cooled by air.

6. The method according to claim 5 wherein said air used to cool said calcined pellets is used as the combustion air in said rotary kiln.

7. The method according to claim 1 wherein said ferric oxide comprises converter flue dust.

8. The method according to claim 1 wherein said pellets are calcined in said rotary kiln at a temperature ranging from 1,200° to 1,350°C.

9. A basic granular slag-forming agent prepared by the method of claim 1.

10. The basic granular slag forming agent according to claim 9 wherein said pellets have a grain size of from 5 to 30 mm.

* * * * *